Sept. 16, 1958   F. N. BECKER ET AL   2,851,716
TRAVELING PNEUMATIC CLEANER FOR SPINNING FRAMES
Filed May 12, 1953   8 Sheets-Sheet 1

INVENTORS
FRANCIS N. BECKER
& CARROLL De V. MILLER
BY
RICHEY, WATTS, EDGERTON & McNENNY
B.D. Watts
ATTORNEYS

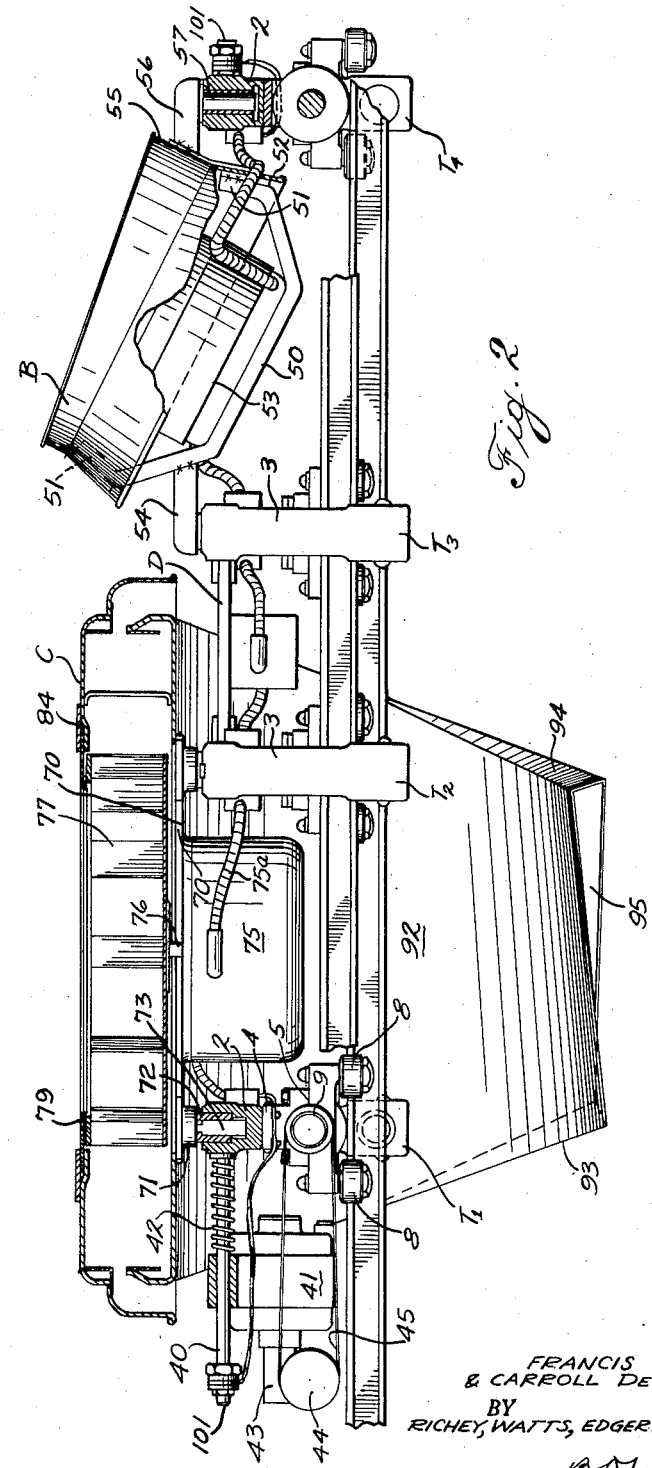

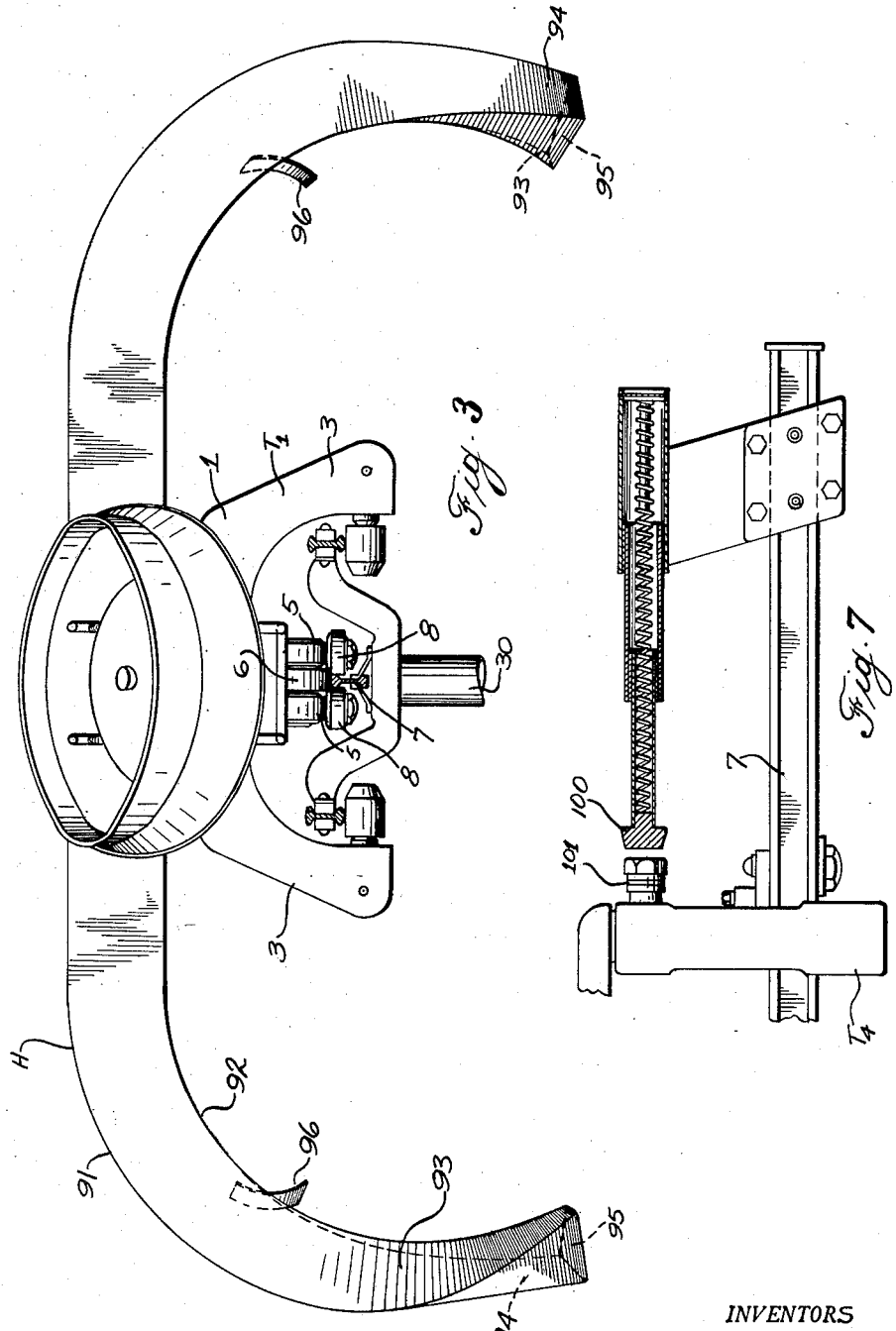

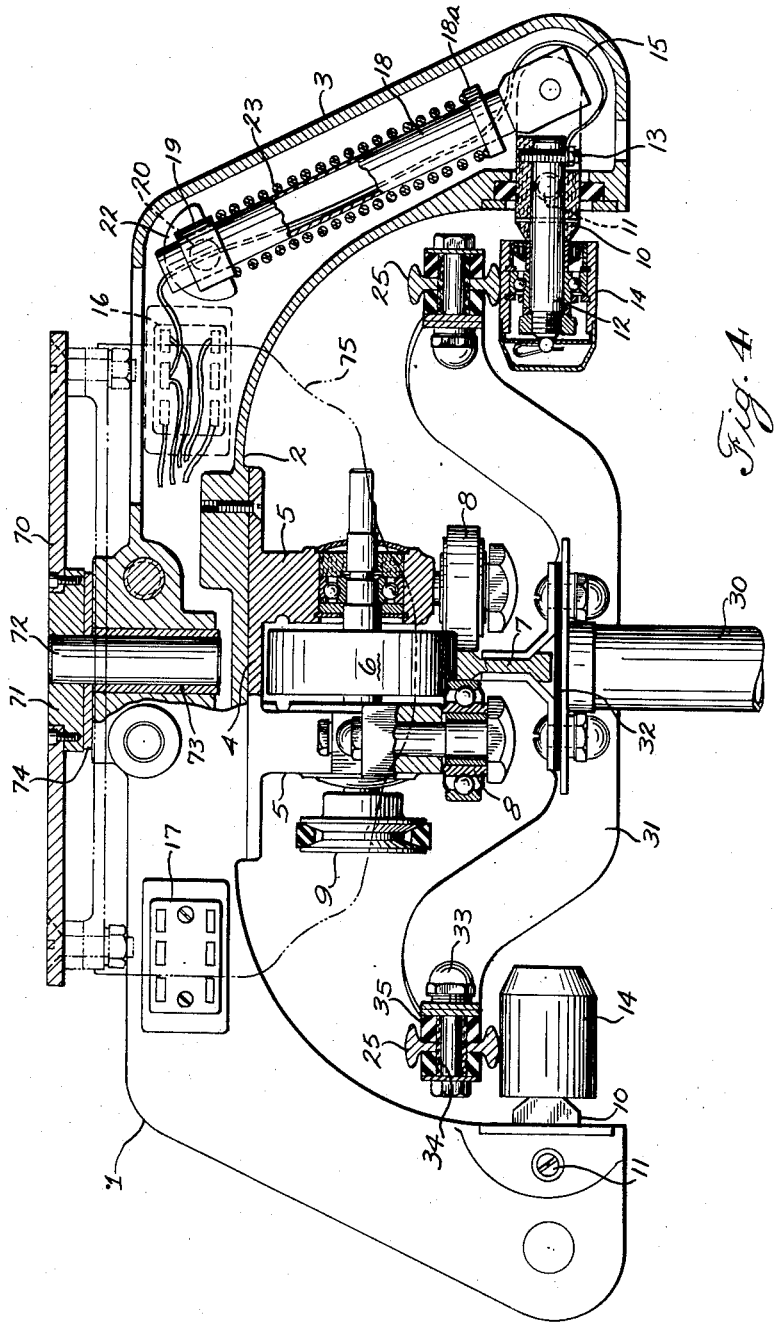

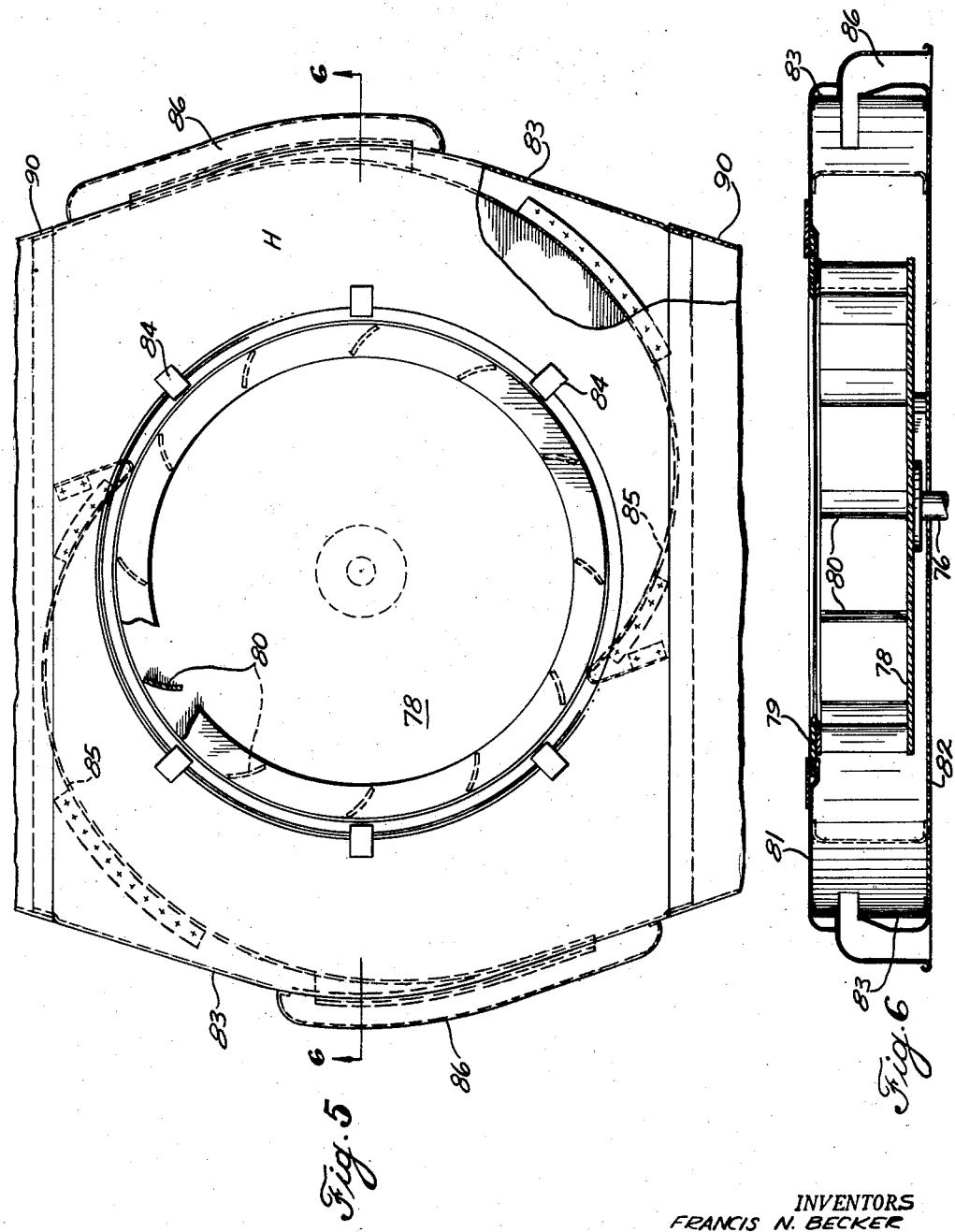

Sept. 16, 1958 F. N. BECKER ET AL 2,851,716
TRAVELING PNEUMATIC CLEANER FOR SPINNING FRAMES
Filed May 12, 1953 8 Sheets-Sheet 7

INVENTORS
FRANCIS N. BECKER
& CARROLL DE V. MILLER
BY
RICHEY, WATTS, EDGERTON & McNENNY
B.D.Watts
ATTORNEYS

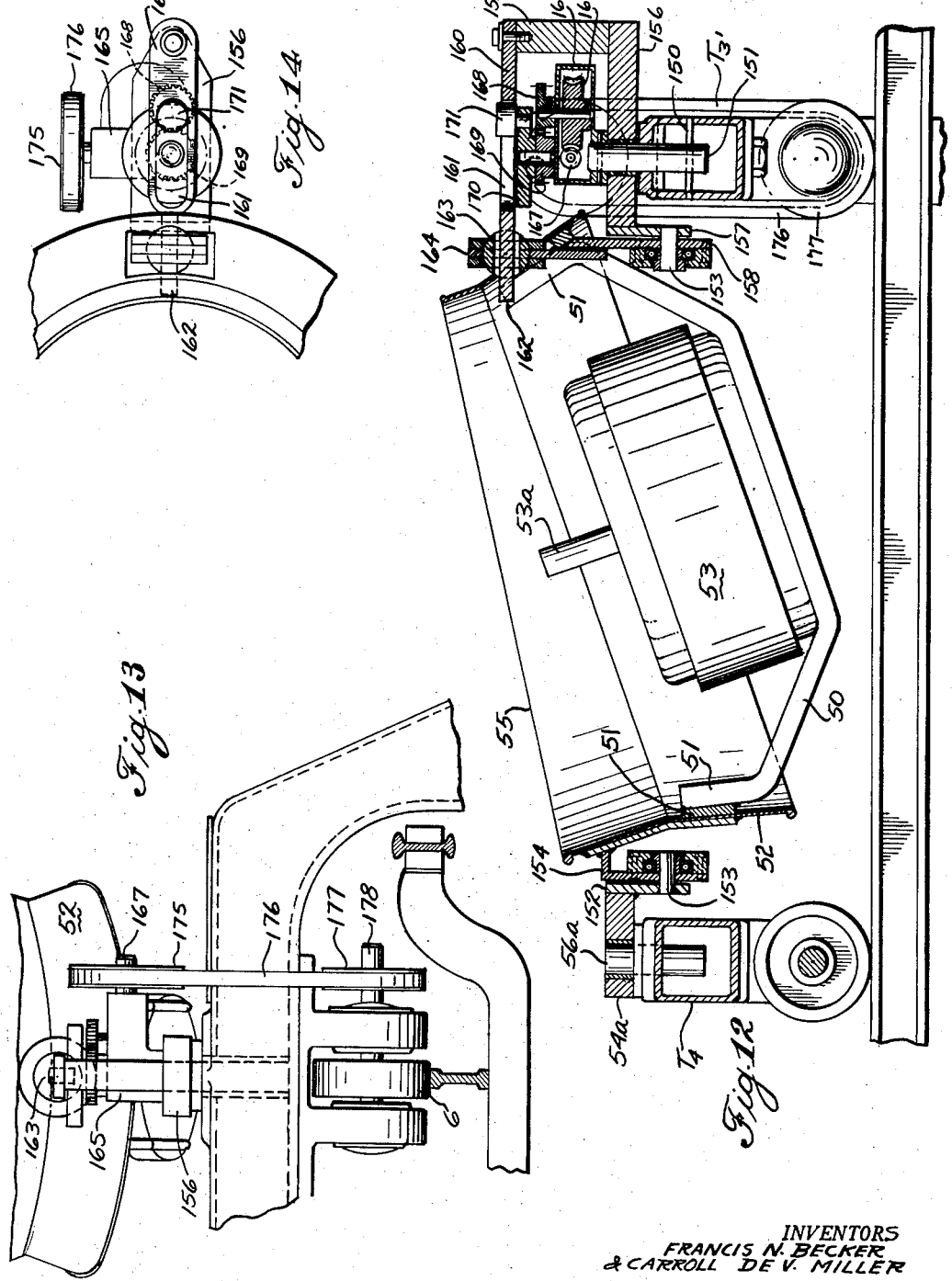

United States Patent Office

2,851,716
Patented Sept. 16, 1958

2,851,716

TRAVELING PNEUMATIC CLEANER FOR SPINNING FRAMES

Francis N. Becker, Lakewood, and Carroll De V. Miller, Rocky River, Ohio, assignors to The American Mono-Rail Company, Cleveland, Ohio, a corporation of Ohio Application May 12, 1953, Serial No. 354,574

12 Claims. (Cl. 15—312)

This invention relates generally to the textile art and, more especially, to new air blowing apparatus for preventing the accumulation of fibers on spinning frames.

One important problem in textile mills is the control of fibers which are liberated in various stages of the manufacture of yarn and which collect on the machinery, walls of the room, posts and other objects. This problem is particularly serious at spinning frames where considerable quantities of fibers are liberated during the conversion of roving into yarn. These liberated fibers may float about in the air for a time but sooner or later tend to accumulate in considerable quantities on the spinning frames. After these fibers have collected in masses, they may be dislodged and may attach to the roving or yarn with the resultant formation of lumps or knots in the yarn which often are larger in diameter than the yarn itself. These lumps or knots may cause breakage of the yarn during subsequent operations, for example, during winding, warping or weaving and when not large enough to cause such breakage, they appear in the cloth and give it an unsightly appearance, and may lower the grade and sales value of the cloth.

The foregoing instances are only a few of the instances where fibers accumulate in a textile mill and pose the problem of controlling the liberated fibers.

Heretofore various type of apparatus have been proposed for solving the problem of preventing accumulation of loose fibers on spinning frames but, so far as I an aware, none of those proposals has been entirely satisfactory. One of such types included blowers which were disposed above and moved over the tops of a plurality of spinning frames while blowing air down onto those frames. Since the roving was disposed close to, and the yarn was disposed farther away from, the place where the air streams left the blower, those streams were moving at a greater velocity when they came into contact with the relatively weak roving than when they reached the more remote and much stronger yarn. When the velocities of the air streams were made low enough to avoid damage to the roving ,the streams did not have enough velocity to afford the desired amount of cleaning action on the parts of the machine in the vicinity of the spindles and yarn bobbins.

In an effort to accomplish the best cleaning with these low velocity air streams, the frequency of passage of the blowers over the spinning frames was increased, either by increasing the speed of travel of the blower along its track or by restricting the number of frames over which a blower traveled. The former course created new troubles and met with speed limiting factors, while the latter course increased the number of blowers required and correspondingly increased the cost of cleaning.

When the blowers were suspended, they had a tendency to sway or swing laterally as they traveled along the overhead track when they attained a certain speed and thus produced a non-uniform cleaning action. When the blowers were mounted to run on a track supported by the spinning frames, the blowers were quite unstable, when traveling around curves, and were liable to tip over and fall off the track with resultant damage to the blower and to the spinning frames and often with injury to the operators.

While both of these types of blowers afforded better cleaning than cleaning by hand, or by certain other proposed apparatus, they left much to be desired.

The present invention aims to avoid the shortcomings of the prior art, particularly those of the above described types of traveling blowers, and to provide new apparatus having new advantages and results. These aims are achieved by apparatus which proportions the cleaning effect of a constant velocity stream of air to the roving and yarn, i. e., by directing a low inertia part of such an air stream against the adjacent, comparatively weak roving, with resultant adequate cleaning in the vicinity of the roving but without damage thereto, and a higher inertia part of the same stream against the more remote, stronger yarn with resultant sufficient cleaning where the yarn is strong enough to resist damage thereby.

Furthermore, the present invention provides a stable apparatus which will not sway or swing with resultant non-uniform cleaning of the machines, which will be able to travel at high speed without danger of tipping off its track, which can travel around curves of short radius without undue wear on the tracks and which can collect its motor-energizing current from the track rails which thus perform the double duty of supporting the traveling apparatus and conducting current for it. Apparatus having these capabilities includes a train having supporting rollers to run on a track, guide rollers to engage the track and prevent lateral displacement of the train relative to the track and hold down rollers to engage the track and prevent tilting of the train relative to the track. The present invention also provides new and novel blowing apparatus and parts thereof which have great utility and constitute new combinations of elements having a new mode of operation and new results.

The present invention will be better understood by those skilled in the art from the following description taken in conjunction with the accompanying drawings in which:

Fig. 2 is a side elevational view, partly in central vertical section, of the apparatus of Fig. 1;

Fig. 3 is an end elevational view of the apparatus of Fig. 1 taken approximately on line 3—3 of Fig. 1;

Fig. 4 is an enlarged, partly sectional view taken on line 4—4 of Fig. 1;

Fig. 5 is a top plan, partly sectional view, of the blower fan and housing;

Fig. 6 is a sectional view taken on line 6—6 of Fig. 5;

Fig. 7 is a side elevational view of a reversing device;

Fig. 12 is a side elevation, partly in section, of blower B modified to reciprocate the stream of air delivered thereby through a vertical plane;

Fig. 13 is a fragmentary end elevational view of the reciprocating apparatus of Fig. 12; and Fig. 14 is a fragmentary top plan view of that reciprocating apparatus.

Figure 1:
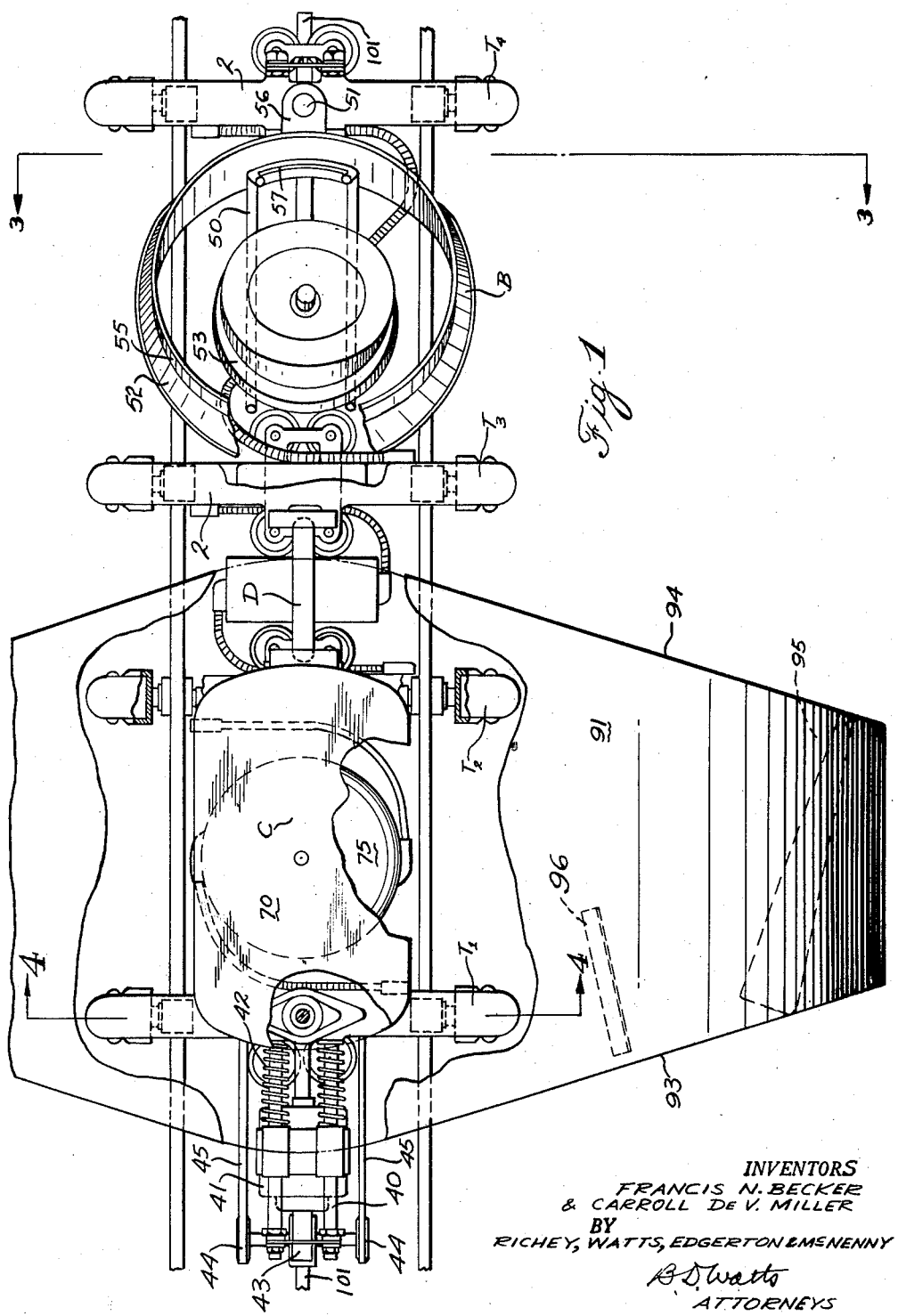
Fig. 1 is a top plan view, with parts broken away, of one form of apparatus embodying the present invention.

The apparatus shown in Figs. 1 to 4 is a train comprising a plurality of similar trucks $T_1$, $T_2$, $T_3$ and $T_4$, the first two of which are coupled together as a pair by blower C and the last two of which are coupled together in a second pair by blower B, the adjacent trucks $T_2$ and $T_3$ being coupled together by bar D.

Since the trucks are all alike, a description of one will serve for all. Each truck comprises a U-shaped frame 1 having a midpart 2 and downwardly diverging legs 3. A bracket 4 having depending legs 5 is fastened to the under side of the midpart 2 and carries a plane-faced supporting roller 6 having its horizontal axle mounted in bearings in legs 5 to run on the top of a rail 7, and also carries two opposed pairs of guide rollers 8 mounted on vertical axes to engage opposite sides of the head of rail 7.

A drive pulley 9 is fixed to one end of the axle of roller 5 and is provided with a V-shaped periphery to receive a driven V belt. A similar pulley may be mounted on the other end of the roller axle and similarly driven, if desired.

Near the lower end of each leg 3, an electrically non-conductive block 10 extends through the inner wall of leg 3. This block is pivotally mounted on pins 11, has a flattened outer end and a central bore. An electrically conductive roller shaft 12 is secured in the bore, as by means of a screw 13, and projects beyond the inner end of said block and has a roller 14 rotatably mounted thereon adjacent to the inner end of block 10. The screw 13 has good electrical contact with the shaft 12 and is connected to a conductor 15 which is led up through the leg and thence through the midpart of frame 1 to a junction box 16.

In each leg 3, the outer flattened end of insulating block 10 is pivotally connected to a rod 18 which, at its upper end, is freely slidable through a sleeve 19 having trunnions 20 seated in V-shaped notches in bosses 22 on the opposed walls of the leg 3. A spring 23 surrounding the rod 18 and compressed between collar 18a on rod 18 and sleeve 19 tends to move block 10 and shaft 12 about pivots 11 and thus to urge the roller 14 against the lower surface of a side rail 25.

The frames 1 are assembled with a three-rail track substantially as shown in Figs. 1 to 4, i. e., with the tread of roller 6 resting on the top of the middle rail 7, with guide rollers 8 engaging the sides of the head of rail 7 and with rollers 14 pressing upwardly against the under surfaces of side rails 25 which are disposed substantially equidistant from and on opposite sides of middle rail 7.

It will be understood that the mid or horizontal part and the legs of each truck define an open bottom space which is shorter vertically than horizontally and in which space the several rails are positioned as well as the rollers which support the truck and prevent it from moving laterally or tilting. Since the rail-engaging surfaces of these rollers are in a vertically short, horizontal zone and may be considered as lying in approximately the same plane, the structure is compact and conserves head room. Since the motor is extended upwardly from close to the top of the support rail, the center of gravity is low. This latter fact, together with the greater width and height of the trucks, makes for stability and permits a high rate of speed of travel along the rails with resultant increased cleaning capacity but at no danger of having the apparatus jump the track.

Track support posts 30 are supported by and extend upwardly from the top of a textile machine such as a spinning frame (not shown). These posts are spaced apart longitudinally of the track and carry U-shaped arms 31 extending transversely of the track. The middle rail 7 of the track is supported by posts 30 and arms 31 and is insulated from these parts, as by insulators 32. Rails 25 are connected to, but insulated from, the ends of arms 31. These arms 31 are U-shaped in cross-section and at their outer ends are provided with bolts 33 which extend through the arm and through rails 25. A fiber bushing 34 is interposed between bolts 33 and rails 25 and insulating washers 35 are disposed between the web of the rail 25 and washers on bolt 33. Thus the rails 25 are insulated from the supporting structure including arms 31 and posts 30.

It will be understood that the weight of each frame 1 and its parts, and any parts supported by the two of the frames when connected together, will be carried by rollers 6 on the top of middle rail 7; that each roller 6 will be maintained on that rail by two pairs of side rollers or guides 8 and that any tendency of the frame or parts supported thereby to tilt relative to the track will be resisted by rollers 14 and springs 23.

It is also to be understood that rails 7 and 25 form parts of the circuits of a three-phase electrical system, rail 7 constituting a grounded phase and rails 25 the other phases, all carrying current from the source of power. When the rails are energized, current will be collected from rails 25 by rollers 14 and conducted thence to junction box 16 whence the current may be delivered to a motor. One phase of the motor is grounded through the apparatus to rail 7 to complete the circuit. When single-phase current is to be used, one rail 25 may be connected to the source of electricity with rail 7 being grounded.

Figure 8:
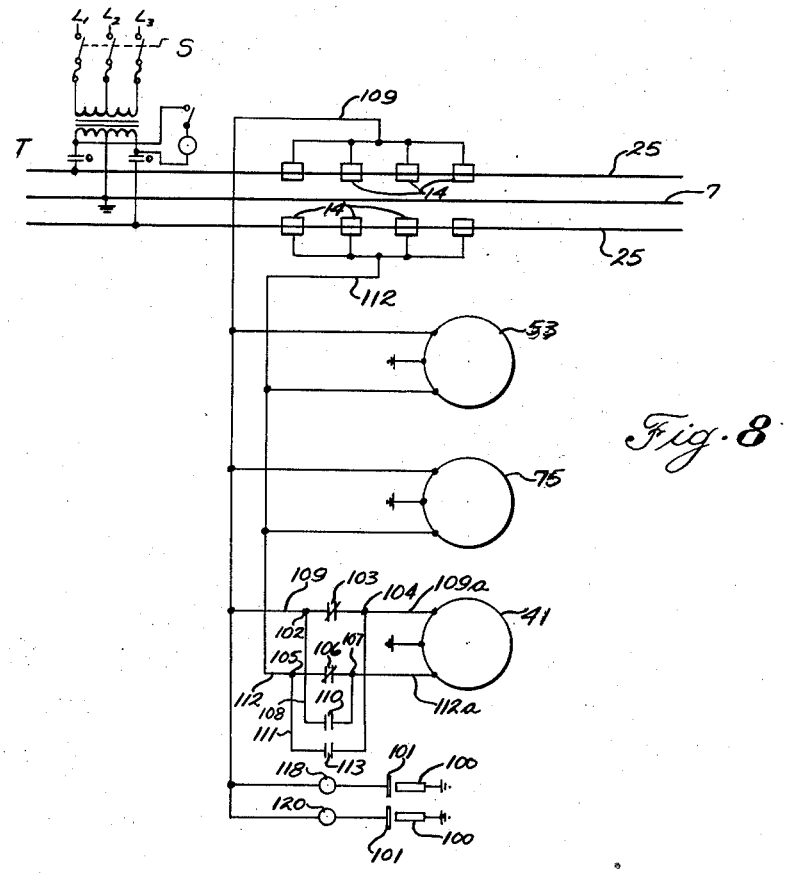
Fig. 8 is an elementary wiring diagram suitable for use with the apparatus shown in the other figures.

As will be noted in Figs. 1, 2 and 8, current collected by one truck may be transmitted to or through other trucks since all the collecting rollers engaging one rail 25 are electrically connected together and those engaging the other rail 25 are similarly connected. For example, in Fig. 2, current collected by truck $T_2$ may be transmitted to the two motors to the left thereof and presently to be described and to and through truck $T_3$ to the motor in blower B.

It will be understood that the current may be picked up by any one or more of the trucks as desired and conducted to other places on the device by suitable connections, for example, those shown in Figs. 1 and 2.

One truck, $T_1$ of Figs. 1 and 2, is provided with means for supporting a driving motor. As shown, parallel rods 40 extend at substantially right angles from the midpart 2 of the truck frame. Motor 41 is slidably mounted on rods 40 and urged away from the truck by springs 42 on rods 40 and abutting against the truck at one end and the motor at the other end. The motor 41 is provided with a gear reducer 43 and one or two V pulleys 44. A V belt 45 extends around one of these pulleys 44 and around a similar pulley 9 which is connected to the shaft of roller 6. Two such belts may be used when two pulleys 9 are provided. It will be understood that when motor 41 is energized, as by current collected from rails 25 by rollers 14, belt 45 will be driven and will drive pulley 9 and hence rotate wheel 6 which, by reason of its frictional engagement with the top of rail 7, will propel the apparatus along the track.

The blower B comprises a motor-driven fan and a rigid support. The support includes a rectangular frame 50 having upturned ends 51 which are encircled by and attached to a ring 52 which also surrounds a fan on the upper end of a motor 53 which is secured to the midpart of frame 50. The frame 50 is positioned at an angle to the horizontal and arms 54 and 56 extend in opposite directions from the frame and ring and carry pins 57 which project down into frames $T_3$ and $T_4$, respectively, for relative swiveling movement, thus the rigid support of blower B includes ends pivotally connected to the tops of trucks $T_3$ and $T_4$ and an intermediate depressed part which is oscillatable or reciprocable relative to those ends.

Since the rotor shaft of motor 53 and ring 55 are inclined upwardly at an angle to the vertical, the fan will blow air upwardly at an acute angle to the track and preferably forwardly, i. e., in the direction in which the device is traveling on the track.

The blower C includes two trucks, T₁ and T₂, which are connected by a rigid member in the form of a rectangular plate 70 having fastened to each end thereof a block 71 carrying a king pin 72 to extend down into bushings 73 positioned in thickened portions of the midparts 2 of the trucks.

Plate 70 has a disk-shaped central opening and has a motor housing 75 connected to the under side of the plate about this opening. The rotor shaft 76 of the motor projects upwardly through the hole in plate 70 and has a fan 77 attached thereto just above the plate (see Figs. 2 and 6). The motor 75 may be energized by current collected from rails 25 and led to the motor, as through conductors 75a.

The fan 77 is of the centrifugal type. It includes a bottom disk-shaped plate 78, a top ring 79 and a plurality of vertically disposed, arc-shaped blades 80 secured at their ends to the plate and ring adjacent to the peripheries thereof. When the fan is rotated, air is drawn in through ring 79 and is propelled outward laterally between blades 80.

A sheet metal housing, indicated generally at H, encloses fan 77 and serves to direct air blown by the fan down onto the track and onto the top of the creels of the spinning frames and down around the outer sides of the track and onto the frame from points adjacent to the roving bobbins down to the yarn spindles. This housing H includes a top wall 81 provided with an air intake opening in its top slightly greater in diameter than ring 79, a bottom wall 82 having a central opening through which rotor shaft 76 extends and side walls 83. If and when it is desired to use a fan of smaller diameter, an adapter ring may be placed on top of wall 81 and under clips 84 to decrease correspondingly the diameter of the opening through the top wall. Within housing H vertical walls 85 extend from wall 81 to 82 and curve outwardly from adjacent to the periphery of fan 77 and serve to direct air laterally to outlets at opposite sides of the housing. Wide curved tubes 86 attached to the sides 83 of housing H serve to admit air from the fan and to direct it down onto the track rails 7 and 25 and thus to keep the track free from fibers.

The housing H is extended laterally from either side thereof in the form of outwardly, downwardly and then inwardly curved branches 90 which, as better appears in Figs. 1, 2 and 3, are gradually constricted toward and are somewhat twisted near their outer ends. These branches 90 have wide upper and lower sides 91 and 92 which gradually decrease in width toward their free ends and vertical end walls 93 and 94 connecting those sides. End wall 93 is narrower than wall 94 at the outer ends of sides 91 and 92. The outlets of branches 90 are, accordingly, quite narrow at walls 93 and gradually increase in width to walls 94. Thus it will be seen that the fore and aft edges 93 and 94 of branches 90 converge toward the outlet ends of the branches, the sides 91 and 92 of branches 90 converge toward each other, and branches 90 are bent so that their outlet ends are at an angle to the direction of travel of the device or to the track.

As a result of the convergence of the ends and sides of the branches and the bending of their outlet ends, the outlets 95 have the trapezoidal cross-sectional shape and approximately the position shown in Fig. 1, and the streams of air issuing from one of these outlets 95 will have substantially the same muzzle velocity in all parts thereof but the momentum and volume will vary from a maximum at the wide end of openings 95 near wall 94 to a minimum at the narrow ends thereof near wall 93. These openings 95, as illustrated, are so positioned that air issuing from the narrow ends of the outlets 95 will be directed against the adjacent roving bobbins and parts of the spinning frame therebeneath, while the air issuing from the wide parts of the openings 95 will be directed against more remote parts of the frames from a point below the roving to or below the yarn spindles. Since the momentum of the air which reaches the roving bobbins is low, it will not disarrange or damage the roving while the momentum of the air directed to the frames in the vicinity of the yarn bobbins and spindles will be sufficient to remove lint and fine fibers from those remote parts of the frames.

Curved, sheet metal scoops 96 extend through the lower walls 92 of branches 90 adjacent to openings in said walls and serve to deflect air from within the branches down onto the roving bobbins or their supports.

The coupling D may be a flat bar attached to two adjacent trucks T₂ and T₃ by a pivotal connection.

The operation of the above described apparatus is substantially as follows: With the track consisting of rails 7 and 25 energized by a suitable source of three-phase current, the terminals on the conductors to motors 42, 53 and 75 are plugged into sockets on one or more of the trucks which are connected to leads from the rails 25. The several trucks and their connections form a train. When motor 41 is energized, wheel 6 is driven and propels the train along the track while motors 53 and 75 rotate the fans attached thereto with resultant blowing of air upwardly ahead of the train by fan 53 and downwardly onto the track and creel and onto the roving and yarn parts of the frame from fan 75. The upwardly and forwardly directed stream of air from fan 53 agitates, and tends to keep fine fibers suspended in, the air and thus to prevent settling of such fibers on the ceiling and walls adjacent to the machines. At the same time blower C removes fibers from the track, creel and side parts of the frame and directs those fibers downwardly and into the aisles between the rows of machines.

When the train reaches one end of the track, rod 100 engages the adjacent plate 101 and electrically connects it to rail 7 with resultant actuation of the relay which reverses the flow of current to motor 41 whereupon the motor propels the train to the other end of the track.

Fig. 8 shows an elementary wiring diagram for electrifying rails 7 and 25 and the several motors on the illustrated apparatus. A source of suitable three-phase current is connected to terminals $L_1$, $L_2$ and $L_3$ in switch S. That switch is connected to transformer T which, in turn, is connected to rails 25 and 7, the latter being grounded.

The four current collector rollers 14 on the same ends of trucks T₁, T₂, T₃ and T₄ are connected electrically to conductor 109 and the corresponding rollers 14 on the other ends of the trucks and engaging the other rail 25 are connected to conductor 112. Conductors 109 and 112 are similarly connected to the ceiling cleaner motor 53 and to frame cleaner motor 75 and to drive motor 41, each of these motors being grounded as indicated.

Figure 10:
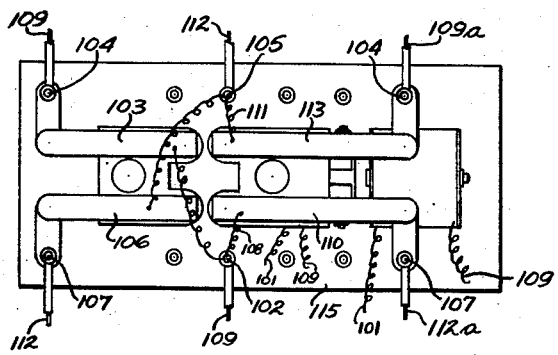
Fig. 10 is a top plan view of the relay of Fig. 9.
Figure 9:
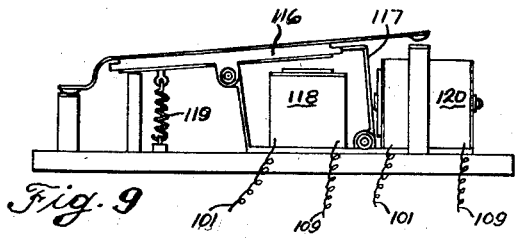
Fig. 9 is a side elevational view of a latch relay which may be used in reversing the blower drive motor.

The foregoing description contemplates apparatus which is to travel along an endless track. When the apparatus is to reciprocate on double end track, reversing means may be employed such as is shown in Figs. 7, 9 and 10 with an addition to the circuits of Fig. 8.

In Fig. 7 the rail 7 near each end of the track has attached thereto a fixture carrying a spring-pressed rod 100 which is engageable with a plate 101 which is carried by, but electrically insulated from, the end truck T₁ or T₄, as the case may be. These rods 100 serve to ground conductor 109 of Fig. 8 as is indicated thereon and, in doing so, to actuate a relay which is shown in Figs. 9 and 10.

As is shown in Fig. 8, conductor 109 is connected to motor 41 through a terminal 102, switch 103, terminal 104 and conductor 109a, while conductor 112 is connected to motor 41 through a terminal 105, switch 106, terminal 107 and conductor 112a. When switches 103 and 106 are closed, as shown in Fig. 8, the rotor of motor 41 will rotate in the same direction as the rotors of motors 53 and 75.

By opening switch 103, conductor 109 may be made to include terminal 102, conductor 108, switch 110, terminal 107, and conductor 112a, while, by opening switch 106, conductor 112 may be made to include terminal 105, branch conductor 111, switch 113, terminal 104 and conductor 109a. When switches 103 and 106 are open and switches 110 and 113 are closed, the rotor of motor 41 will rotate in a direction opposite to that of the rotors of motors 53 and 75.

Figs. 9 and 10 show a latch relay which may be used to open and close switches 103, 106, 110 and 113 of Fig. 8. In these figures the latch relay is shown as comprising a base plate 115 which supports a pivoted lever 116, a pivoted latch 117, a coil 118 to pivot lever 116 against the resistance afforded by spring 119 and a coil 120 to retract latch 117 against the resistance offered by a spring (not shown). Conductor 109 is connected to one end of the winding of coil 118, the other end of that winding being connected to plate 101 at one end of the train; conductor 109 is also connected to one end of the winding of coil 120, the other end of that winding being connected to plate 101 at the other end of the train. Base plate 115 has terminals 102, 104, 105 and 107 mounted thereon. Lever 116 carries for conductors constituting parts of switches 103, 106, 110 and 113 and these several switch parts are connected to terminals 102 and 105 as indicated, while the ends of those switch parts which project beyond the ends of lever 116 make contact with terminals 104 and 107.

The operation of motor 41 when the train is to run back and forth on a double end track, as contrasted with running in one direction on a closed track, is substantially as follows: Assuming that the switches 103 and 106 are closed and switches 110 and 113 are open, current will flow to motor 41 through the switches 103 and 106 and the conductors in series therewith to rotate the rotor of motor 41 in one direction and thereby propel the train toward one end of the track. When the plate 101 at the forward end of that train engages conductor rod 100, current will flow through conductor 109 and coil 118, thereby energizing the core which will attract lever 116 against the resistance offered by spring 119, with resultant opening of switches 103 and 106 and the closing of switches 110 and 113. As these latter switches close, latch 117 engages with lever 116 to retain it in this actuated position. While the lever is so retained, current will flow through motor 41 by way of the branch circuits 108 and 111 above described and the rotor of motor 41 will rotate in the opposite direction with resultant movement of the train toward the other end of the track. When the plate 101 on the then leading end of the train engages the grounded conductor 100 at that end of the track, current will flow through the winding of coil 120, thereby energizing the core which will attract latch 117 to it and out of engagement with the lever 116 which will then pivot in response to spring 119 with resultant opening of switches 110 and 113 and closing of switches 103 and 106. Thereupon the motor will be reversed and the train will move toward the far end of the track.

Figure 11:
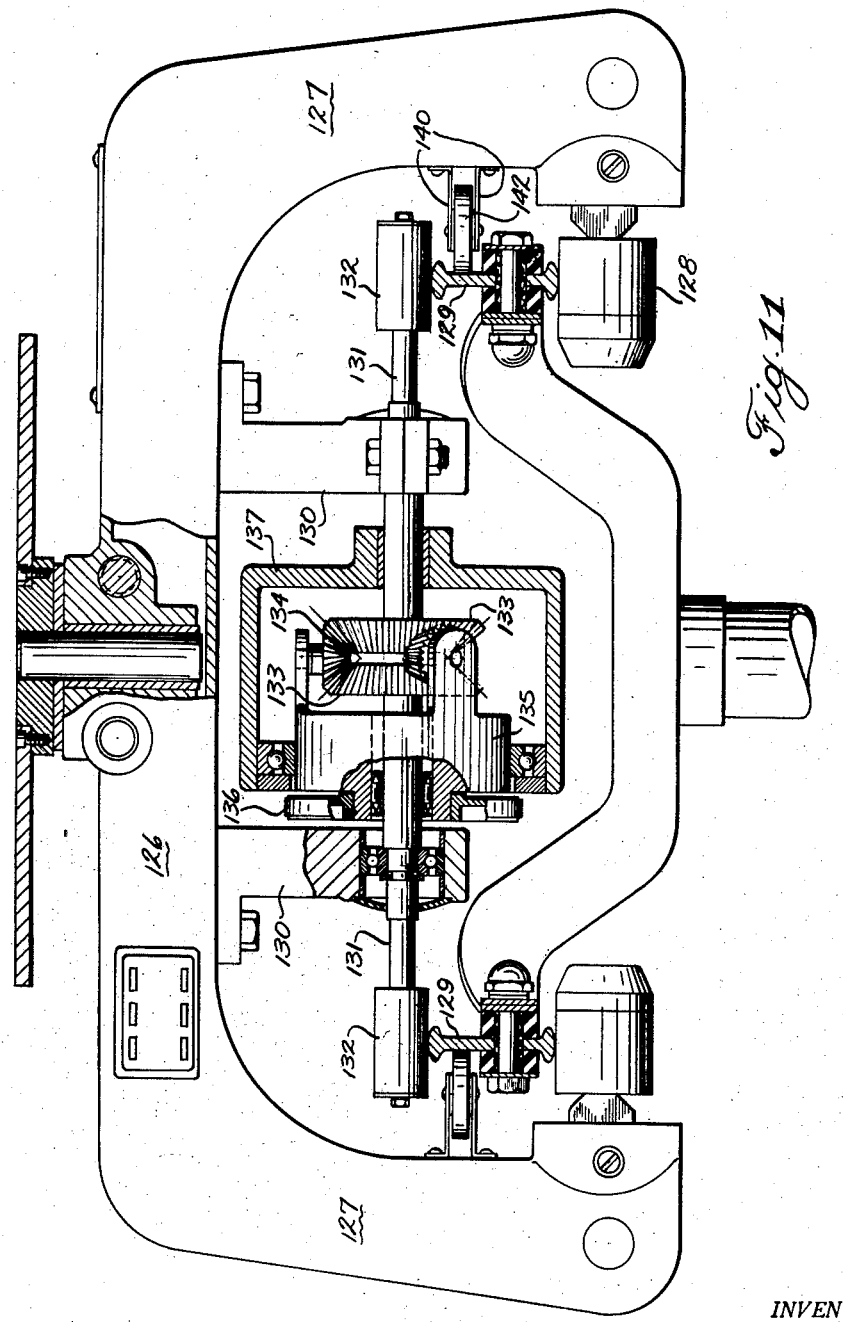
Fig. 11 is a view similar to Fig. 4 but showing a modified form of apparatus.

Fig. 11 shows a modified form of apparatus embodying the present invention.

In this embodiment of the invention, the trucks 125 are generally like frames $T_1$ to $T_4$. Each truck includes a horizontal part 126 and legs 127 extending downwardly from the ends thereof. Near the lower end of each leg, rollers 128 are pivotally mounted to engage with the lower surface of substantially parallel rails 129. The rollers 128 may be current collecting rollers similar to rollers 14 and may be mounted and electrically connected as shown in Fig. 4.

Brackets 130 extend downwardly from the horizontal part of the frame and carry bearings in which drive shafts 131 are mounted, each shaft having at its outer end a roller 132 to run on rail 129 and at its inner end a bevel gear 133. Three bevel gears 134 carried by cage 135 mesh with gears 133. Cage 135 is rotatably mounted on one shaft 131 and may be driven by a belt 136 from a motor (not shown). A gear housing 137 is rotatable in one shaft 131 and on cage 135. Brackets 140 extend inwardly from each leg of the trucks and carry guide rollers 142 to bear against the outer side of the adjacent rail 129.

When two of the above described frames are connected as by a rigid member and are mounted on rails 129 and the differential gearing is energized, the device will be propelled along rails 129 by rotation of rollers 132 and guided by rollers 142.

Figs. 12, 13 and 14 show means for reciprocating the blower B so that the air stream from that blower will oscillate through a vertical plane when the blower moves along its track. This blower unit is quite like the unit shown in Figs. 1, 2 and 3 and described above but differs therefrom in certain respects, as will presently appear. Ends 51 of frame 50 are attached to ring 52 which surrounds a fan (not shown) on the rotor 53a of a motor 53.

Truck $T_4$ is like the frames described above but frame $T_3'$ differs from those frames by having a pin 150 extending through a pin 151 to prevent rotation of the latter.

A pin 56a is secured in frame $T_4$ and extends up through a bearing in horizontal arm 54a. A bar 152 extends downwardly from one end of arm 54a and carries a horizontal pin 153 on which is rotatably mounted a vertical bracket 154 attached to ring 55 which extends upwardly from ring 52.

Truck $T_3'$ has a horizontal arm 156 rotatably mounted on pin 151, with a vertical downwardly extending bar 157 attached to one end thereof and carrying a horizontal pin 153 on which is rotatably mounted a vertical bracket 158 which is secured to ring 52 adjacent to the other end of frame 50.

Arm 156 has an upwardly extending post 159 at its end opposite to bar 157 and pivotally supports one end of a lever 160 which has a cam slot 161 in its midpart and a free end 162 which projects through a spherical member 163 rotatably mounted in a retaining member 164 secured to bracket 158 and extending through an opening in ring 52.

A gear case 165 is fixed to pin 150 between arm 156 and lever 160 and houses a driven worm gear 166 and a driving worm 167. The shaft of gear 166 is fixed to a gear 168 which is outside of case 165 and which meshes with gear 169. This latter gear is keyed to a disk 170 carrying an eccentrically positioned cam roller 171 disposed in slot 161 of lever 160.

At its outer end worm 167 is fitted with a pulley 175 which is driven by belt 176 from a pulley 177 keyed to the axle 178 of supporting roller 6.

The trucks $T_4$ and $T_3'$ may rotate about vertical pins 56a and 151 to an extent sufficient to permit the trucks to travel around curves in the supporting tracks. The frame 50 may rotate to a limited extent about horizontal pins 153. Both of these rotational movements are permitted and the latter is caused by the combination of parts carried by truck $T_3'$. The lever 160 is reciprocated by cam follower 171 and moves spherical member 163 laterally thus rotating frame 50 about pins 163.

Since the gear case 165 is fixed to truck $T_3'$, pulleys 175 and 177 are maintained in fixed relation. Turning movement of truck $T_3'$ relative to frame 50 may result in movement of cam follower 171 in lever 160 and may also result in turning movement of spherical member 163 and even in movement of bracket 158 about its pivot.

When frame 50 and ring 52 are oscillated, the stream of air from the fan on shaft 53a is moved back and forth through a vertical plane and, hence, the effect of that steam will extend to a greater area than when the frame 50 does not so oscillate.

Having thus described the present invention so that others skilled in the art may be able to understand and practice the same, we state that what we desire to secure by Letters Patent is defined in what is claimed.

What is claimed is:

1. Blower apparatus comprising two spaced apart trucks extending transversely of their line of travel, each having an elongated horizontal part and legs extending downwardly from the ends thereof, brackets depending from the horizontal parts of said trucks, each bracket carrying a flangeless support roller and guide rollers to engage the top and side surfaces of a support rail, rods projecting from the horizontal part of one of said trucks, a motor slidable on said rods and operatively connected to the support roller of said truck to propel the apparatus along a support rail, rigid means above and pivotally connecting together the horizontal parts of said trucks, roller axles pivotally carried by the lower ends of said legs and projecting toward each other, and hold-down, tilt-preventing rollers mounted on said axles to project beneath and engage the under surfaces of rails parallel to a support rail.

2. Blower apparatus comprising two spaced apart trucks extending transversely of their line of travel, each having an elongated horizontal part and legs extending downwardly from the ends thereof, brackets depending from the horizontal parts of said trucks, each bracket carrying a flangeless support roller and guide rollers to engage the top and side surfaces of a support rail respectively, rods projecting from the horizontal part of one of said trucks, a motor slidable on said rods, belt means connecting the motor rotor to the support roller of said truck, resilient means engaging said truck and motor and resisting movement of the motor toward said truck, rigid means above and pivotally connecting together the horizontal parts of said trucks, roller axles pivotally carried by the lower ends of said legs and projecting toward each other, and hold-down, tilt-preventing rollers mounted on said axles to project beneath and engage the under surfaces of rails parallel to a support rail.

3. Blower apparatus comprising two spaced-apart trucks extending transversely of their line of travel, each having an elongated horizontal part and hollow legs extending downwardly from the ends thereof, brackets depending from the horizontal parts of said trucks and carrying roller shafts, flangeless supporting rollers on said shafts, means carried by said trucks for preventing movement of said flangeless rollers laterally off a support rail, rigid means resting on and pivotally connecting the horizontal parts of said trucks, insulating blocks pivotally carried by said legs near their lower ends, electrically conductive roller shafts extending through said blocks toward each other from within said legs, electrically conductive rollers on the adjacent ends of said conductive shafts, means in said legs to urge said conductive rollers upwardly, and current conductors connected to said conductive shafts and extending upwardly in said legs.

4. Blower apparatus comprising two spaced-apart trucks extending transversely of their line of travel, each having an elongated horizontal part and hollow legs extending downwardly from the ends thereof, brackets depending from the horizontal parts of said trucks and carrying flangeless support rollers, means carried by said trucks for preventing movement of said flangeless rollers laterally off a support rail, rigid means resting on and pivotally connecting the horizontal parts of said trucks, insulating blocks pivoted in openings in said legs near their lower ends, electrically conductive roller shafts extending through said blocks toward each other from within said legs, electrically conductive rollers on the adjacent ends of said shafts, rods pivotally connected to said blocks within the legs, resilient means compressed between abutments on the rods and on the legs and urging the rods downwardly, and electrical conductors connected to said shafts and extending upwardly in said legs.

5. Blower apparatus comprising two spaced-apart trucks extending transversely of their line of travel, each having an elongated horizontal part and hollow legs extending downwardly from the ends thereof, brackets depending from the horizontal parts of said trucks and carrying flangeless support rollers, means carried by said trucks for preventing movement of said flangeless rollers laterally off a support rail, rigid means above and pivotally connecting the horizontal parts of said trucks, approximately horizontal roller shafts pivotally supported by said legs near their lower ends and projecting toward each other from within said legs, a motor supported beneath the rigid means between the trucks with its rotor shaft extending up through said rigid means, a housing supported on the top of said rigid means and having conduits to direct air streams outwardly, downwardly and inwardly, a fan on the rotor shaft in said housing, and means including conductors within certain of said legs for electrically connecting said motor with certain of said pivoted shafts.

6. Apparatus for removing lint from textile machines comprising two spaced apart trucks, each truck defining the top and sides of a vertically short, horizontally longer space adapted to receive a plurality of rails and including an elongated horizontal part and shorter legs diverging downwardly from the ends thereof, means in said space for supporting the truck on a rail including a roller carried by said horizontal part, means in said space adapted to engage a rail for preventing lateral movement of the truck relative to the support rail, means in the space adapted to engage the undersides of rails in said space to prevent tipping moving movement of the truck relative to the support rail, the underside of the support roller and the means for preventing lateral and tipping movement of the truck being positioned in approximately the same horizontal plane, rigid means resting on top of and pivotally connected to the horizontal parts of each of the said trucks, a motor supported by said rigid means between said trucks and extending upwardly from near said horizontal plane and having an upwardly extending rotor shaft, and a fan on the upper end of the rotor shaft.

7. The combination of elements set forth in claim 6 in which a fan housing is disposed on the top of said rigid means, the said rotor shaft extends up through the rigid means into said housing and the fan is disposed in said housing.

8. The combination of elements set forth in claim 6 in which a fan housing is disposed on the top of said rigid means and has opposite, outwardly, downwardly and inwardly extending conduits to direct air currents onto textile machines therebelow, and in which the fan is positioned in said housing.

9. The combination of elements set forth in claim 6 in which said rigid means includes an intermediate depressed part on which the said motor is supported.

10. The combination of elements set forth in claim 6 in which said rigid means includes an intermediate depressed oscillatable part on which the said motor is supported and means for oscillating said part.

11. The combination of elements set forth in claim 6 in which the means for preventing tipping movement of the truck includes shafts projecting toward each other and pivotally carried by the legs near their lower ends, rollers on said shafts to engage the undersides of rails in said space, and resilient means cooperating with said shafts to urge the rollers upwardly.

12. The combination of elements set forth in claim 6 in which means are provided for propelling trucks along the rails, said means including a motor supported by one of said trucks and means driven by said motor to drive said support roller.

References Cited in the file of this patent

UNITED STATES PATENTS

| | | |
|---|---|---|
| 359,753 | White | Mar. 22, 1887 |
| 474,355 | Baker | May 10, 1892 |
| 547,823 | Van Slyke | Oct. 15, 1895 |
| 695,137 | Beecher | Mar. 11, 1902 |
| 818,608 | Brower | Apr. 24, 1906 |
| 836,995 | Schroeder | Nov. 27, 1906 |
| 867,007 | Boyes et al. | Sept. 24, 1907 |
| 915,071 | Carr | Mar. 16, 1909 |
| 1,079,373 | Spirewfki | Nov. 25, 1913 |
| 1,454,804 | Wright | May 8, 1923 |
| 1,801,001 | Henderson | Apr. 14, 1931 |
| 1,801,141 | Connors | Apr. 14, 1931 |
| 1,819,886 | Frank et al. | Aug. 18, 1931 |
| 1,882,366 | Lytton | Oct. 11, 1932 |
| 2,179,913 | Bess | Nov. 14, 1939 |
| 2,291,598 | Lawrence | Aug. 4, 1942 |
| 2,537,866 | Tanner | Jan. 9, 1951 |
| 2,610,349 | Moore | Sept. 16, 1952 |
| 2,613,611 | Simon | Oct. 14, 1952 |
| 2,635,275 | Holtzclaw | Apr. 21, 1953 |

FOREIGN PATENTS

| | | |
|---|---|---|
| 8,030 | Great Britain | July 16, 1903 |
| 147,987 | Switzerland | Sept. 16, 1931 |
| 693,196 | Germany | July 3, 1940 |
| 862,157 | France | Jan. 9, 1951 |

UNITED STATES PATENT OFFICE
CERTIFICATE OF CORRECTION

Patent No. 2,851,716 September 16, 1958

Francis N. Becker et al.

It is hereby certified that error appears in the printed specification of the above numbered patent requiring correction and that the said Letters Patent should read as corrected below.

Column 6, line 20, for the numeral "42" read -- 41 --; column 12, line 16, list of references cited, under "FOREIGN PATENTS" for "862,157   France ---- Jan. 9, 1951"

read

-- 852,146   France ---- Oct. 16, 1939 --;

Signed and sealed this 27th day of January 1959.

(SEAL)
Attest:

KARL H. AXLINE
Attesting Officer

ROBERT C. WATSON
Commissioner of Patents